United States Patent
Munger et al.

(10) Patent No.: US 6,209,417 B1
(45) Date of Patent: Apr. 3, 2001

(54) ADJUSTABLE PEDAL WITH CONSTANT RATIO CABLE ASSEMBLY

(75) Inventors: Jean Munger, Royal Oak; Christopher A. Bortolon, Clawson, both of MI (US)

(73) Assignee: Teleflex, Incorporated, Plymouth Meeting, PA (US)

( * ) Notice: Subject to any disclaimer, the term of this patent is extended or adjusted under 35 U.S.C. 154(b) by 0 days.

(21) Appl. No.: 09/406,963

(22) Filed: Sep. 28, 1999

Related U.S. Application Data

(63) Continuation-in-part of application No. 09/335,112, filed on Jun. 17, 1999.

(51) Int. Cl.⁷ .................................................. G05G 1/14
(52) U.S. Cl. ................................................ 74/512; 74/560
(58) Field of Search ................... 74/512, 502.4, 74/560

(56) References Cited

U.S. PATENT DOCUMENTS

| | | | |
|---|---|---|---|
| 2,847,872 | 8/1958 | Todd | 74/478 |
| 2,853,164 | 9/1958 | Sturdy | 192/3 |
| 3,288,239 | 11/1966 | Ristau | 180/78 |
| 3,314,405 | 4/1967 | Irgens | 123/108 |
| 3,361,165 | 1/1968 | Irgens | 143/32 |
| 3,643,524 * | 2/1972 | Herring | 74/512 |
| 3,643,525 * | 2/1972 | Gibas | 74/512 |
| 3,691,868 * | 9/1972 | Smith | 74/512 |
| 3,754,480 | 8/1973 | Bodnar et al. | 74/512 |
| 3,986,363 | 10/1976 | Beaman et al. | 60/700 |
| 4,007,647 | 2/1977 | Carlson | 74/501 |
| 4,182,198 * | 1/1980 | Dartnell | 74/560 X |
| 4,870,871 * | 10/1989 | Ivan | 74/560 X |
| 4,875,384 | 10/1989 | Hirayama et al. | 74/500 |
| 4,889,005 * | 12/1989 | Crack | 74/502.4 X |
| 5,546,827 * | 8/1996 | Pospisil | 74/502.4 |
| 5,722,302 * | 3/1998 | Rixon et al. | 74/512 |
| 5,913,956 | 6/1999 | Ewing | 74/513 |
| 6,014,910 * | 1/2000 | Oda et al. | 74/502.4 X |

FOREIGN PATENT DOCUMENTS 0919902    6/1999   (EP) .

\* cited by examiner

Primary Examiner—Charles A Marmor
Assistant Examiner—Saúl Rodríguez
(74) Attorney, Agent, or Firm—Howard & Howard

(57) ABSTRACT

An adjustable pedal assembly (110) is disclosed for maintaining a constant ratio between the movement of the pad (142) and the movement of the output core element (132) in all adjusted operational positions of the pad (142). A support (112) is included for attachment to a vehicle structure and a pedal lever (120) is rotatably supported by the support structure (112) for rotation about a pivot axis (122) and including an actuator arm (138) extending in a first direction from the pivot axis (122) and a pad arm (140) extending in a second direction from the pivot axis (122). A slide member (114) is slidably supported by the support (112) for adjustment between various operational positions. A conduit (124) has a first end (126) attached to the slide member (114) for movement therewith during the adjustment between the operational positions and a second end (128) for attachment to the vehicle support structure. A motion transmitting core element (132) is slidably supported by the conduit (124) and has a first end (134) extending from the first end (126) of the conduit (124) and operatively attached to the pedal lever (120) and a second end (136) extending from the second end (128) of the conduit (124) for attachment to a control member for transmitting motion from the pedal lever (120) to the control member. The assembly characterized by the slide member (114) being slidably supported by the support (112) and including an extension (130) extending in transverse relationship to the actuator arm (138). The first end (134) of the core element (132) extends from the first end (126) of the conduit (124) and in sliding engagement with the actuator arm (138) of the pedal lever (120).

9 Claims, 1 Drawing Sheet

ADJUSTABLE PEDAL WITH CONSTANT RATIO CABLE ASSEMBLY

RELATED APPLICATION

This application is a continuation-in-part of co-pending application Ser. No. 09/335,112 filed Jun. 17, 1999.

BACKGROUND OF THE INVENTION

The subject invention relates to an adjustable pedal assembly for use in automotive vehicles wherein the pedal position may be changed to accommodate various drivers.

Description of the Prior Art

The concept of an adjustable pedal for automotive vehicles has been known for some time but is just recently being accepted. Such assemblies include a support for attachment to the vehicle and a carrier supporting a pedal lever for pivotal movement during normal operation, e.g., applying the brakes. The pedal lever is attached to a mechanism for transmitting the pedal lever movement to some component of the vehicle, such as the brakes. A problem is that of the mechanism being capable of maintaining the movement of the vehicle component in proportion or a constant ratio to the movement of the pedal lever regardless of the adjusted position of the carrier on the support. One such assembly for adjusting the pad position while adjusting the position of a cable output is disclosed in U.S. Pat. No. 5,913,946 to Ewing. That assembly includes a complex parallel linkage for adjustment of the operational position of the pad. Other systems are disclosed in U.S. Pat. No. 3,643,524 to Herring and U.S. Pat. No. 3,643,525 to Gibas. However, there remains a need for a simple system wherein a pedal lever supports the pad at one end and actuates the cable assembly at the other end, i.e., a simplified connection between the cable and the pedal lever.

SUMMARY OF THE INVENTION AND ADVANTAGES

An adjustable pedal assembly comprising a support for attachment to a vehicle structure and a pedal lever rotatably supported by the support structure for rotation about a pivot axis and including an actuator arm extending in a first direction from the pivot axis and a pad arm extending in a second direction from the pivot axis. A slide member is slidably supported by the support for adjustment between various operational positions. A conduit has a first end attached to the slide member for movement therewith during the adjustment between the operational positions and a second end for attachment to support structure. A motion transmitting core element is slidably supported by said conduit and has a first end extending from the first end of the conduit and operatively attached to the pedal lever and a second end extending from the second end of the conduit for attachment to a control member for transmitting motion from the pedal lever to the control member. The assembly is characterized by the slide member being slidably supported by the support and including an extension extending in transverse relationship to the actuator arm with the first end of the core element extending from the first end of the conduit and in sliding engagement with the actuator arm of the pedal lever.

Accordingly, the subject invention provides an adjustable pedal assembly which may be adjusted between various operating positions while maintaining the operative and proportional connection between the pedal pad and the vehicle component to be controlled. This is accomplished in a simple and inexpensive assembly which may be easily installed into the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
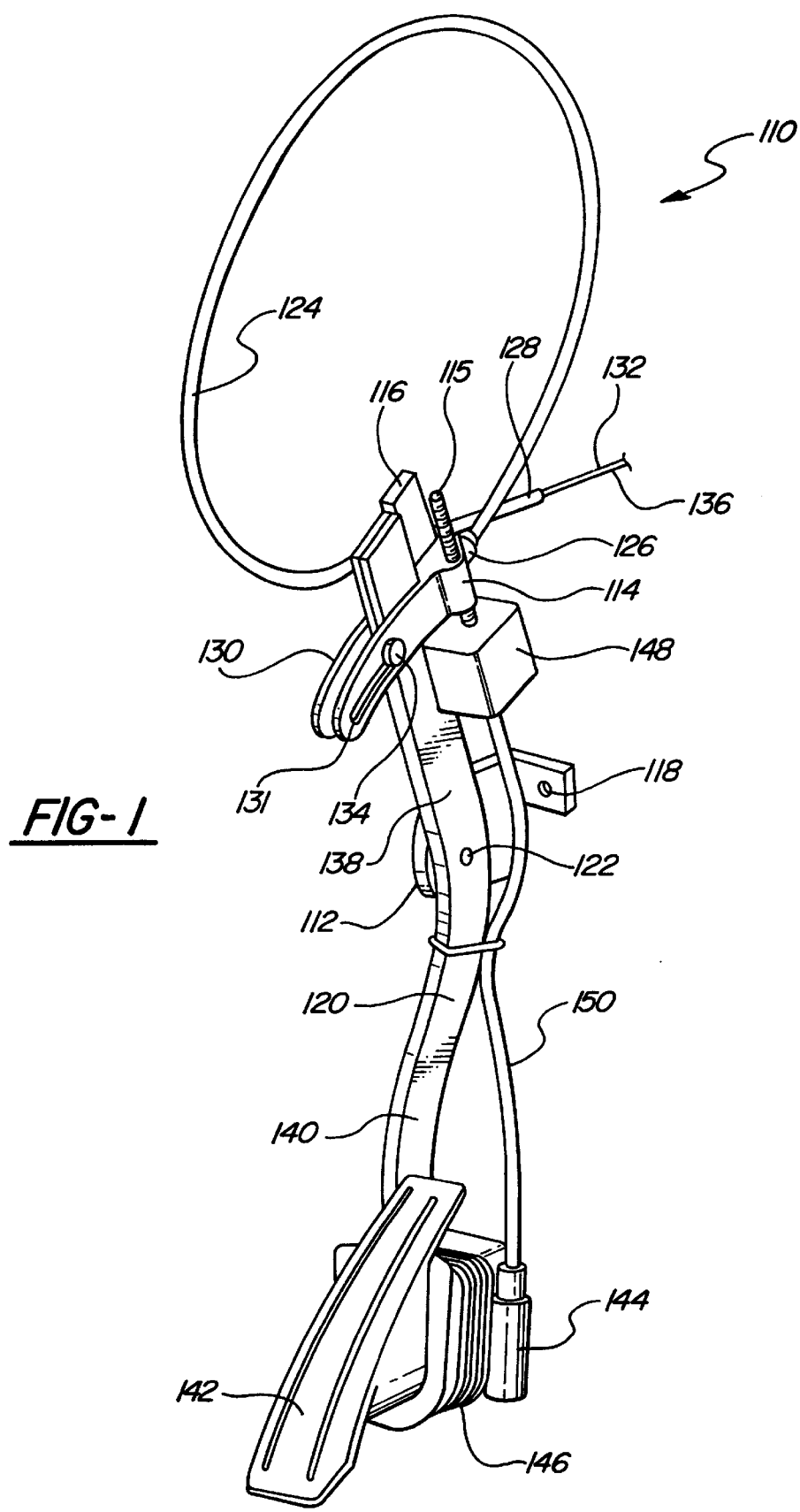
FIG. 1 is a perspective view of a preferred embodiment.

Referring to the FIGURE, an adjustable pedal assembly is generally shown at 110.

The adjustable pedal assembly 110 comprises a support or bracket 112 for attachment to a vehicle structure (not shown). A pedal carrier or slide member 114 is slidably supported by the support 112 for adjustment between various operational positions. The support 112 includes a rod 116 and the slide member 114 is slidably supported on the rod 16. The slide member 114 is adjusted to various operational positions along the rod 116 by a screw 115 threadedly engaging the slide member 114. The support 112 also includes a connection hole 118 for attaching the support 112 to vehicle structure.

A pedal lever 120 is movably supported by the support 112 for operational movement relative to the support 112. A pivotal connection comprising a pin 122 pivotally supports the pedal lever 120 on the support 112 for the operational movement.

The assembly 110 includes a conduit 124 having a first end 126 attached to the slide member 114 for movement therewith during the adjustment between the operational positions and a second end 128 for attachment to support structure (not shown). The first end 126 includes a fitting molded about the conduit 124 for attachment to the slide member 112. The slide member 112 includes an extension 130 extending in transverse relationship to the actuator arm 138 and the first end 134 of the core element 132 extends from the first end 126 of the conduit 124 and is in sliding engagement with the actuator arm 138 of the pedal lever 120. The extension 130 is also in sliding engagement with the actuator arm 138 of the pedal lever 120. More specifically, a lost motion connection comprising a slot 131 and cross pin 134 is disposed between and interconnects the core element 132 and the actuator arm 138 for allowing the core element 132 to be moved by the actuator arm 138 independently of the slide member 114. The cross pin 134 is slidably retained in the slot 133 and is slidable along the edge of the actuator arm 138. The pin 122 interconnects the support 112 and the pedal lever 120 below the rod 116 whereby the rod 116 extends above the pin 122.

A motion transmitting core element 132 is slidably supported in and by the conduit 124 and has a first end extending from the first end 126 of the conduit 124 and attached to the cross pin 134 which engages the pedal lever 120 and a second end 136 extending from the second end 128 of the conduit 124 for attachment to a control member (not shown) for transmitting motion from the pedal lever 120 to the control member. More specifically, the pedal lever 120 includes an actuator arm or portion 138 extending in a first direction from the pivotal connection defined by the pin 122 and the first end 134 of the core element 132 is in sliding engagement with the actuator arm 138 a first predetermined distance from the pivotal connection 122.

The extension 130 extends from the support 112 in transverse relationship to the actuator arm 138 and the first end 126 of the conduit 124 is attached to the slide member 114. The pedal lever 120 also includes a pedal arm or portion 140 extending in a second direction from the pivotal connection defined by the pin 122 so that the pin 122 acts as a fulcrum in response to a pedal force applied to the pedal arm 140 to place the core element 132 in tension.

A pedal pad 142 is movably supported on the pad arm 140 for movement between various adjusted pad distances from the pivot axis 122 for being engaged by a vehicle operator. The pad 142 in the embodiment of FIG. 6 is supported by the pad arm 140 for movement rectilinearly in a direction transverse to the axis of the pad arm 140 by a mechanism as shown in U.S. Pat. No. 5,884,532, also in the name of applicant C. Bortolon herein and assigned to the assignee of the subject invention, wherein a connector drive screw or gear box 144 rotates telescoping screws within the boot 146.

These components for moving the pad 142 are part of a drive mechanism for adjusting the slide member 114 and the pad 142 in unison. The drive mechanism includes a drive nut integral with the slide member 114 and the connector drive screw 115 threadedly engaging the slide member 114 for moving the slide member 114 in response to rotation of the drive screw 115. Accordingly, the drive mechanism includes a pad drive screw 144 for moving the pad 142 in response to rotation of the pad drive screw 144.

The drive mechanism also includes an interconnect for maintaining a constant ratio between the effective distance of the slide member 114 from the pivot axis 122 and the effective distance of the pad 142 from the pivot axis 122 in all of the adjusted positions. This interconnect of the drive mechanism includes a gear box 148 in driving engagement with the pad drive screw 144 and the connector drive screw 115 by or through a rotary drive cable 150 interconnecting the gear box 148 and at least one of the drive screw 144. In order to maintain the constant ratio between movement of the pad 142 and the core element 132, this interconnect maintains the effective distance of the slide member 114 from the pivot axis 122 equal to the effective distance of the pad 142 from the pivot axis 122 in all of the adjusted positions. Even though the pad 142 may move an actual distance which is greater than the distance the core element 132 moves, the effective distance will be maintained equal. This may be accomplished by varying the pitch of the drive screws and/or the gear train ratios in the gear box 148.

The invention has been described in an illustrative manner, and it is to be understood that the terminology which has been used is intended to be in the nature of words of description rather than of limitation.

Obviously, many modifications and variations of the present invention are possible in light of the above teachings and the invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth an old and well known combination in which the invention resides and these antecedent recitations should be interpreted to cover any combination in which the inventive novelty has utility. In addition, the reference numerals are merely for convenience and are not to be in any way to be read as limiting.

What is claimed is:

1. An adjustable pedal assembly comprising;
    a support (112) for attachment to a vehicle structure,
    a pedal lever (120) rotatably supported by said support structure (112) for rotation about a pivot axis (122) and including an actuator arm (138) extending in a first direction from said pivot axis (122) and a pad arm (140) extending in a second direction from said pivot axis (122),
    a slide member (114) movably supported by said support ( 112) for adjustment between various operational positions,
    a conduit (124) having a first end (126) attached to said slide member (114) for movement therewith during said adjustment between said operational positions and a second end (128) for attachment to support structure, and
    a motion transmitting core element (132) slidably supported by said conduit (124) and having a first end (134) extending from said first end (126) of said conduit (124) and operatively attached to said pedal lever (120) and a second end (136) extending from said second end (128) of said conduit (124) for attachment to a control member for transmitting motion from said pedal lever (120) to the control member,
    said assembly characterized by said slide member (114) being slidably supported by said support (112) and including an extension (130) extending in transverse relationship to said actuator arm (138), said first end (134) of said core element (132) extending from said first end (126) of said conduit (124) and in sliding engagement with said actuator arm (138) of said pedal lever (120).

2. An assembly as set forth in claim 1 wherein said support (112) includes a rod (116) and said slide member (114) is slidably supported on said rod (116).

3. An assembly as set forth in claim 2 wherein said first end (134) of said core element (132) is attached to said actuator arm (138) a first predetermined distance from said pivotal connection (122).

4. An assembly as set forth in claim 3 wherein said pedal arm (140) extends in said second direction from said pivotal connection (122) so that said pivotal connection (122) acts as a fulcrum in response to a pedal force applied to said pedal arm (140) to place said core element (132) in tension.

5. An assembly as set forth in claim 1 wherein said extension (130) is in sliding engagement with said actuator arm (138) of said pedal lever (120).

6. An assembly as set forth in claim 5 wherein said pivotal connection includes a pin (122) interconnecting said support (112) and said pedal lever (120) below said rod (116), said rod (16) extending above pin (122).

7. An assembly as set forth in claim 6 including a lost motion connection between said core element (132) and said actuator arm (138) for allowing said core element (132) to be moved by said actuator arm (138) independently of said slider member (114).

8. An assembly as set forth in claim 4 including a drive device for moving said slide member (114) on said rod (116).

9. An assembly as set forth in claim 4 including a pad (136) supported on said pad arm (118) for being engaged by a vehicle operator.

* * * * *

UNITED STATES PATENT AND TRADEMARK OFFICE
Certificate

Patent No. 6,209,417                                                  Patented: April 3, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Jean Munger, Royal Oak, MI.

Signed and Sealed this Twenty-Sixth Day of November 2002.

CHARLES A. MARMOR
*Supervisory Patent Examiner*
Art Unit 3681